INVENTORS
GEORGE GERARD &
JACOB BRAYMAN
BY Brumbaugh, Free
Graves & Donohue
Their ATTORNEYS INVENTORS
GEORGE GERARD &
JACOB BRAYMAN
BY Brumbaugh, Free
Graves & Donohue
Their ATTORNEYS Nov. 13, 1962 G. GERARD ET AL 3,063,594
CLOSURE SYSTEMS FOR PRESSURE VESSELS
Filed Aug. 13, 1959 6 Sheets-Sheet 4

INVENTORS
GEORGE GERARD &
JACOB BRAYMAN
BY Brumbaugh, Free
Graves & Donohue
Their ATTORNEYS

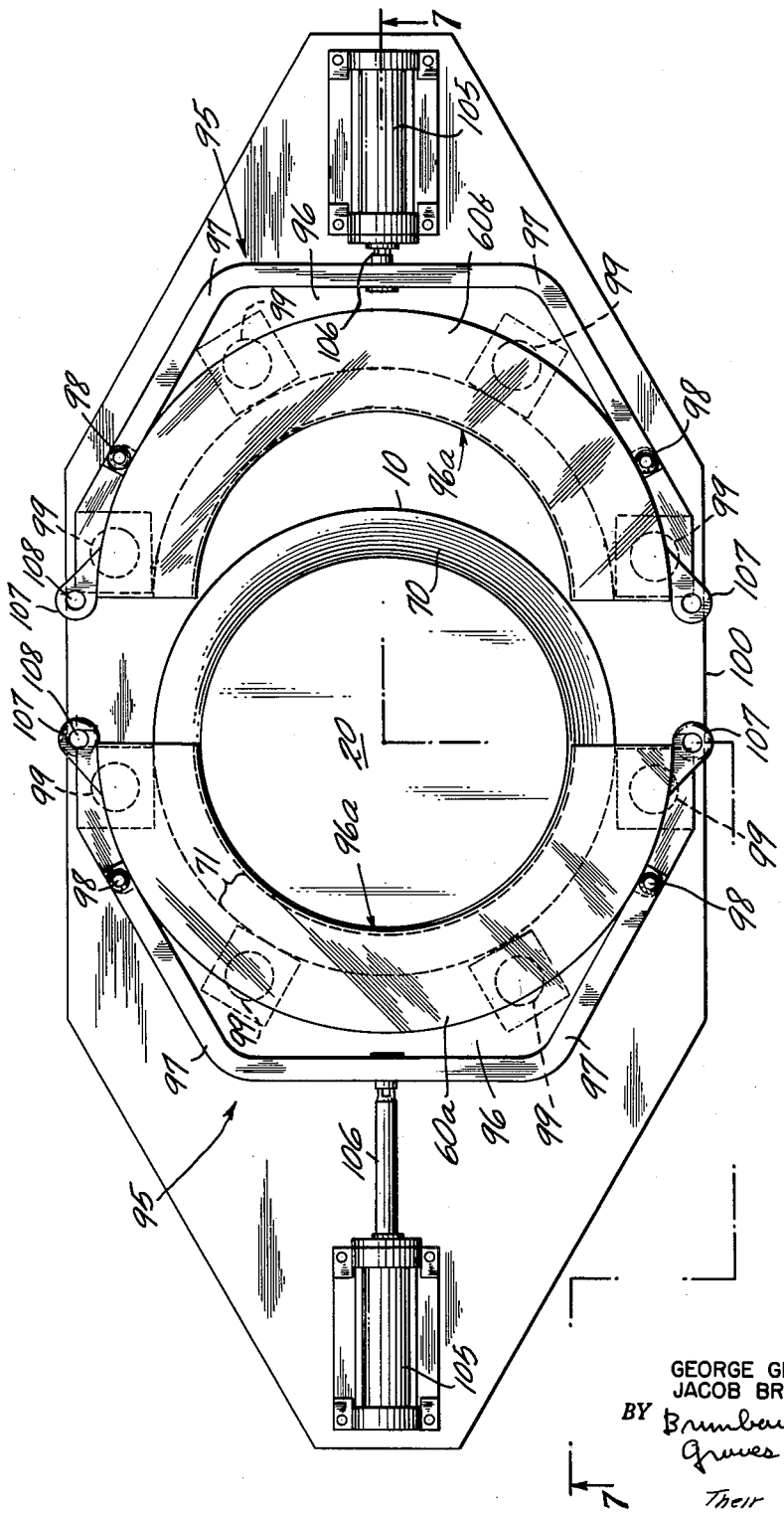

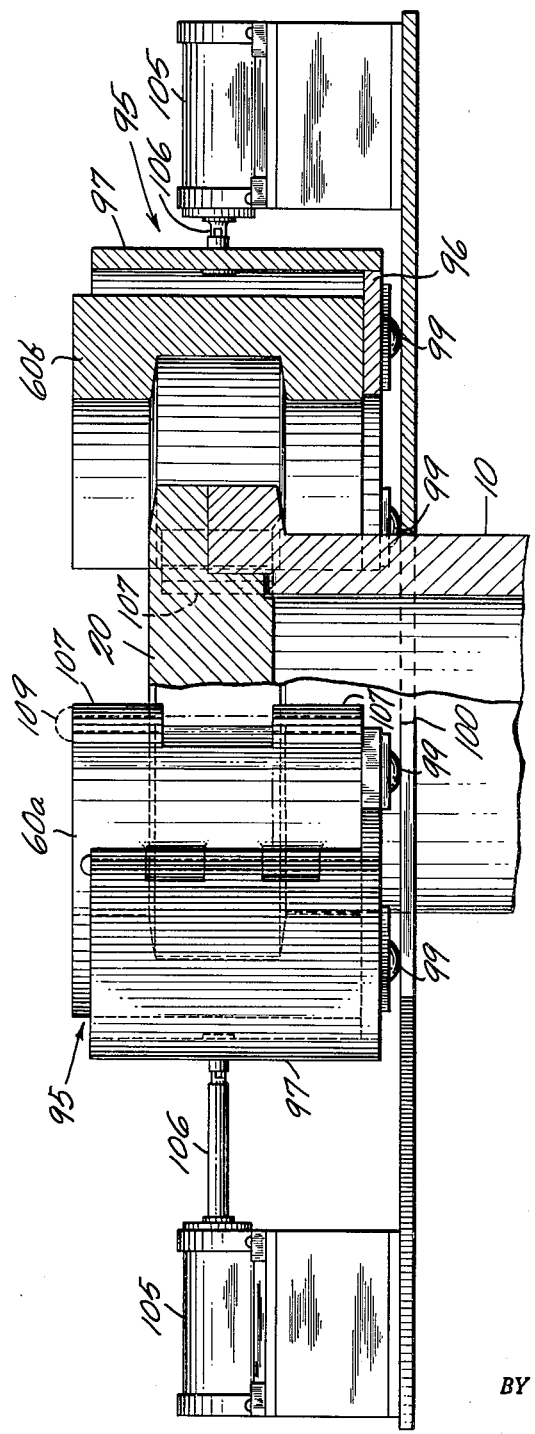

United States Patent Office 3,063,594
Patented Nov. 13, 1962

3,063,594
CLOSURE SYSTEMS FOR PRESSURE VESSELS
George Gerard, Yonkers, and Jacob Brayman, Staten Island, N.Y., assignors to Barogenics, Inc., a corporation of New York
Filed Aug. 13, 1959, Ser. No. 833,420
9 Claims. (Cl. 220—46)

This invention relates to systems for closing and sealing vessels adapted to contain a medium which is subjected to high pressure and/or high temperature. Such pressure vessels are useful as autoclaves in which chemical reactions take place under high pressure and temperature conditions. They are also useful as vessels in which nuclear reactor elements are subjected to corrosion testing by fluids contained at high pressure and temperature within the vessel.

In the past, the closure systems for such vessels have not always been capable of providing satisfactory operation when subjected to the pressure and temperatures which have been desired. Under such conditions there has been a tendency for the vessel to open up and leak, and, on occasions serious deformations in structure have been encountered which have resulted in complete and dangerous failure of the assembly. Also, the placement, securement and removal of such closure systems has been complex and has required an amount of manipulation which has resulted in protracted delays in changing over from one operation to another.

We have invented a closure system which substantially overcomes the foregoing difficulties and provides a substantial improvement in operation.

A more specific advantage in our new closure system is that the components are so arranged and constructed that the structure is dimensionally self-compensating for thermal expansions produced therein when exposed to high temperature and deformation and leakage is thereby avoided.

In our closure system, the pressure-containing chamber is closed with a plug which is unthreadedly received in the mouth of the vessel. The plug is retained in the mouth by a cap disposed over the plug which grips the side of the vessel. Since the plug is not threadedly engaged with the mouth of the vessel, high concentrations of stress are not developed at the region of contact between the mouth and the plug.

The cap extends outside the vessel downwardly and then inwardly to present an upturned surface which may lock with a down-turned shoulder formed on the side of the vessel. When the slack between the cap and the shoulder of the vessel is taken up, as hereinafter more specifically described, the plug is forcibly engaged within the mouth of the vessel.

When the plug is so engaged, an annular area at the bottom thereof presses against an annular elastic gasket which is seated on a sealing surface extending circumferentially of the opening of the pressure-containing chamber. The sealing surface, gasket and the bottom surface of the plug are elements which together form a pressure seal by compression of the gasket between the two surfaces.

It is important that such seal should remain unbroken during exposure of the cap to high temperature when expansion of the cap would tend to lift and disengage it from the plug. That problem is met by providing in the construction of the cap and the plug for an expansion of the cap which is less than or at most equal to the expansion of the plug caused by such high temperatures. As the temperature within the chamber is raised from a low to a high value, the seal between the plug and the annular sealing surface of the vessel will thereby be maintained and the compression forces on the gasket may actually be increased.

The cap may be a one piece member which is engaged with the plug by tightening bolts screwed through the cover to bear against the plug. The cap may be secured to the vessel by a plurality of instanding lugs formed on the sides of the cover to engage with a corresponding plurality of outstanding lugs on the vessel. The lugs on the cover are aligned with the lugs on the vessel and then drawn into contact with each other by turning the tightening bolts and simultaneously forcing the plug into its seat.

Preferably the sides of the cover should have a snug fit with the sides of the vessel and the plug should fit snugly in the mouth of the vessel.

Since the plug does not depend for its positioning upon a threaded or other engagement with the inner wall of the mouth, a minor deformation of the vessel which tends to open the mouth will not be of such critical inmportance in causing a failure of the assembly. Moreover, the snug fit of the cover about the vessel will serve to check any such deformation before it has become substantial. The checking of outward deformation of the vessel may result in stresses tending to close the mouth of the vessel, but the snug fit of the plug in the mouth will provide a lateral support serving to check deformation from such stresses.

We have found that there are advantages when the cap is comprised of two separate members. Such members, each forming one-half of the cap, may be moved laterally over the plug and into locking relationship with the sides of the vessel. In this case, the locking shoulder on the vessel may be a continuous annular surface tapered for a wedging engagement, with an arcuate shoulder formed at the lower end of each cover member. Such wedging action upon assembly of the two cover members may be utilized for forcibly urging the plug down into the mouth of the vessel and against the gasket, as hereinafter more fully described.

In order to facilitate lateral movement and assembly of the cover members, we have found it useful to employ special supports, anti-friction devices, and power movers, the structure and advantages of which are hereinafter described.

As a safeguard against violent extrusion of the plug and complete failure of the assembly, a reinforcing means in the form of a ring or sleeve may be placed around the cover members to prevent any such outward lateral movement of the cover members as would disengage them from the shoulder of the vessel. Since only complete disengagement would permit the plug to escape from the vessel, such reinforcement will provide an effective safeguard against any violent or explosive failure of the assembly.

By appropriate configuration of the cap, plug and vessel, we have found that it is feasible to minimize or counteract a number of the stresses and deformations produced by high pressure and temperature. In particular, we have found that the tendency of pressure exerted on the bottom of the plug to cause upward dishing thereof is a tendency which can be overcome (1) by vertically aligning the area of the top of the plug contacted by the cap with the area of the bottom of the plug contacted by the gasket so that the top area is disposed at least as far inwardly as the bottom area, and (2) by seating the plug partially on the lip which surrounds the mouth of the vessel, and by shaping such lip to produce a downward bulge in the plug in response to downward pressure exerted on the plug and lip from the cap means.

For a better understanding of the invention, reference is made to the following detailed description of representative embodiments thereof, and to the accompanying drawings wherein:

FIG. 6 is a plan view of another modification of the FIG. 3 embodiment; and

FIG. 7 is a side elevation, taken partially in cross-section of the FIG. 6 modification.

Figure 1:
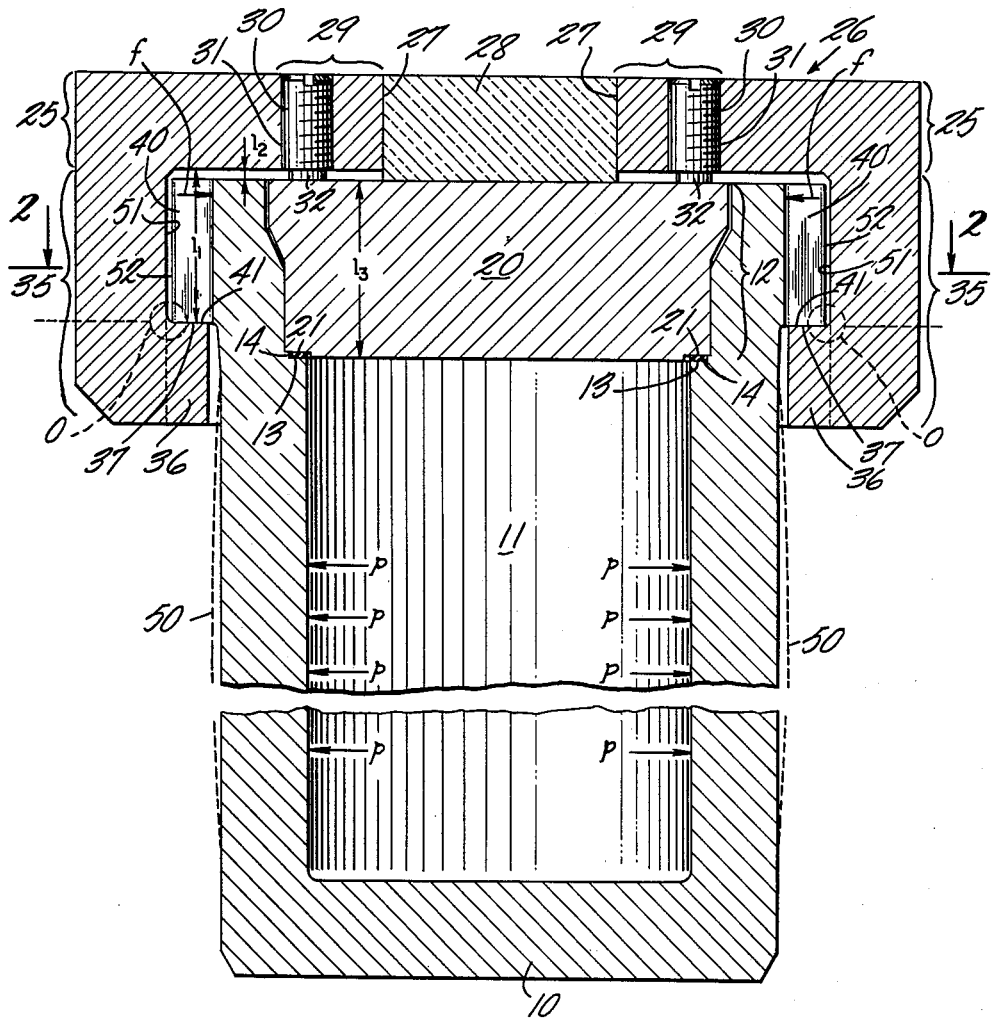
FIG. 1 is a front elevation in cross-section of one embodiment of the invention.

In FIG. 1 the reference numeral 10 designates a pressure vessel having an interior chamber 11 for containing a medium (not shown) at high pressure and/or at high temperature. Communication is afforded from the top of vessel 10 to chamber 11 through an unthreaded mouth 12. The mouth 12 is radially enlarged at its junction with chamber 11 to provide an upturned annular sealing surface 13 which surrounds the opening at the upper end of chamber 11. Seated on this surface is an annular elastic gasket 14.

The upper end of the chamber 11 is closed off by an unthreaded circular plug 20 which is received in the mouth 12, and which has a snug fit therein. Extending around the bottom of the plug is an annular recess of upside-down L cross-section whose upper side is formed by a flat, annular, downward-facing surface 21. This surface rests upon the annular gasket 14 to render the plug 20 seated thereon.

The plug 20 is retained in place in the mouth 12 by a unitary cover 26 having a head portion 25 which overlies the plug. As shown in FIG. 1, the head portion 25 may have formed therein a central bore 27 which is of lesser diameter than the top of the plug, and in which is disposed a body 28 of insulating material having a purpose to be later described. In an annular region 29 surrounding bore 27, the head portion 25 is in vertical registry with the top of the plug. Within this annular region are disposed a circle of tightening bolts 30 which are equiangularly spaced around the bore 27. These bolts pass in threaded relation through holes 31 formed in the head portion 25 to have the forward ends 32 of the bolts bear against the top of plug 20.

In addition to the head portion 25, the unitary cover 26 has a sleeve portion 35 which extends downwardly from the head portion 25 and outside the vessel 10 to encompass that part of the vessel which surrounds the mouth 12. At is lower end the sleeve portion 35 is provided with a plurality of instanding lugs 36 which (FIG. 2) are equiangularly distributed around the vessel to have the lugs 36 alternate with lug interspaces. The top of each lug 36 forms a horizontal upturned shoulder 37.

The instanding lugs 36 on the cover 26 are matched by a plurality of lugs 40 which are outstanding from the vessel 10 above the lugs 36. The bottom of each of these lugs 40 forms a horizontal downturned shoulder 41. As in the case of the lugs 37 on the cover 26, the lugs 40 on the vessel 10 are equiangularly distributed around the vessel to have the lugs alternate with lug interspaces. It will be noted that in FIG. 1 the shoulders 41 of the lugs 40 on the vessel are disposed in the vertical dimension nearer to the top of the vessel than is the surface 21 of the plug 20 by which the plug makes contact with the gasket 14.

Figure 2:
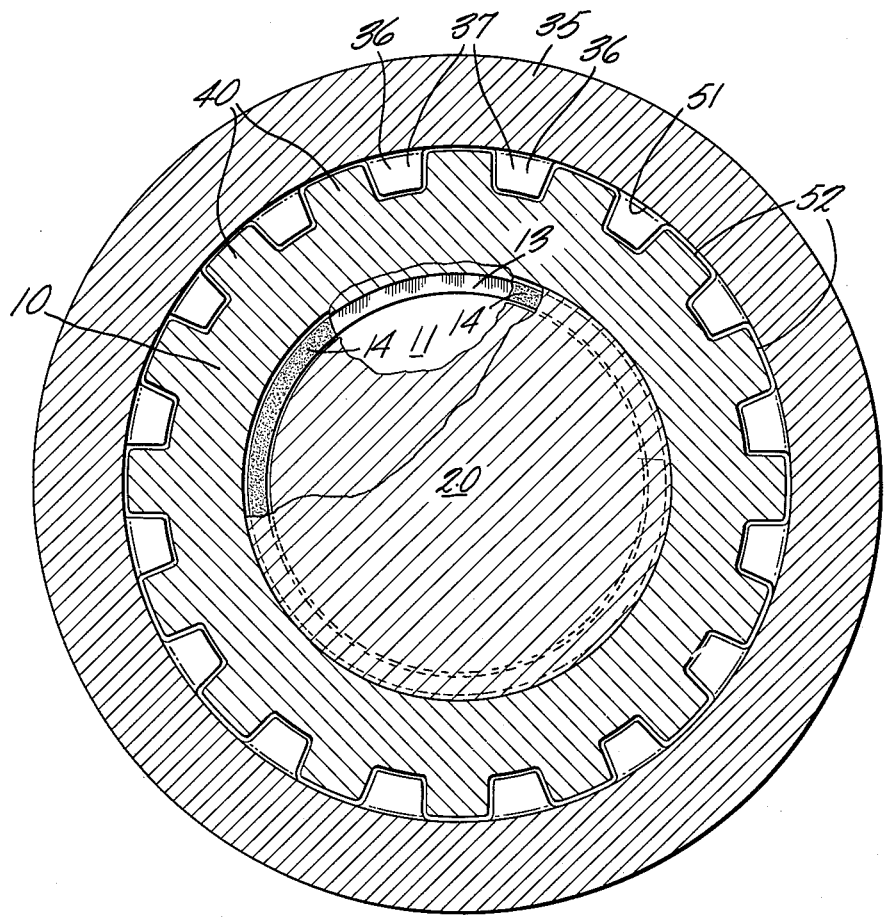
FIG. 2 is a plan view, taken in cross-section as indicated by the arrows 2—2 in FIG. 1, of the FIG. 1 embodiment.

In the showings of FIGS. 1 and 2, the cover 26 is represented as having an angular position relative to vessel 10 such that each lug 36 on the cover is in vertical registry with the one of the interspaces between the lugs 40 on the vessel. As particularly shown in FIG. 2, each lug 36 is dimensioned to pass vertically with clearance through such interspace. Accordingly, so long as the cover 26 is in the represented angular position, the cover may be freely moved vertically to be raised from the vessel or to be replaced thereon.

The cover 26 is secured to the vessel 10 in the following manner. First, while the cover 26 is in the angular position represented by FIGS. 1 and 2, the cover is lowered over the vessel. At this or an earlier time, the bolts 30 are adjusted to withdraw the bolt ends 32 toward the cover in an amount creating a vertical clearance between the respective shoulders of lugs 40 and 36 when the cover comes to rest by the bearing of the bolt ends 32 on the top of plug 20. This clearance permits the lowering of the cover to be followed by an angular adjustment thereof which brings each lug 36 on the cover directly beneath a corresponding lug 40 on the vessel.

After the cover has been so angularly adjusted, the tightening bolts 30 are turned to cause the bolts to advance in the holes 31. The turning of the bolts 30 initially causes the cover 26 to be drawn upwardly until each upturned shoulder 37 on a cover lug 36 engages with the down-turned shoulder 41 of the registering lug 40 of the vessel to thereby secure the cover 26 on the vessel. Once the cover has been so secured, the turning of the bolts 30 is continued to produce a pressure engagement between the shoulders 37 and 41, and to force the plug 20 down into the mouth 12 to produce compression of the elastic gasket 14 between the downturned surface 21 on the plug and the upturned surface 13 in the vessel mouth. The turning of the bolts is terminated upon reaching a value of bolt-tightening torque which represents a limit in accordance with ASME standards or good engineering practice.

The above-described vessel assembly is characterized by a number of advantageous features which will now be considered. The first of these is that the plug 20 is held in the mouth 12 by the downward force exerted thereon from cover 26 rather than by a threading or other engagement of the plug with the inner wall of the mouth. Consequently, the upward pressure exerted on the plug from the chamber 11 will not create a high stress concentration in the region of the interface between the plug and the mouth.

Furthermore, under conditions of high pressure within the chamber 11 of vessel 10, there will be a lateral pressure which is represented by the arrows $p$ in FIG. 1. Such lateral pressure, alone or combined with high temperature, will tend to produce in the vessel wall a deformation in the form of the radial expansion indicated in FIG. 1 by the dotted bulge lines 50. While this deformation may be partially elastic, it may also include a progressive inelastic radial creep of the vessel wall. The normal effect of such deformation if there were a threaded coupling, would be to open the mouth of the vessel to loosen and make weaker such threaded coupling. In such instances, and particularly when the deformation is progressive and inelastic, failure of the closure is likely to occur.

In the FIG. 1 embodiment, however, since the plug 20 is held in the mouth 12 by the cover 26 rather than by a threaded engagement of the plug with the inner periphery of the mouth, an opening up of the mouth will not reduce the firmness with which the plug 20 is seated on the gasket 14. On the contrary, if in the FIG. 1 embodiment the mouth 12 should open somewhat due to radial expansion, the shoulders 41 of the vessel will engage over a greater area with the shoulders 37 of the cover 26 and thereby secure even more firmly the cover and the plug.

While, in the embodiment of FIGURE 1, a slight amount of radial expansion of the upper part of the vessel may not be harmful, it is desirable to check such radial expansion and to keep it within safe limits. The sleeve portion 35 of the cover performs that function. As shown in FIG. 1, the sleeve portion 35 is constructed so that the inner vertical surface 51 thereof has a snug fit with the outer vertical surfaces 52 of the lugs 40 on the vessel. As the wall of the vessel 10 radially expands, such radial expansion will eventually bring the outer vertical surfaces 52 of the lugs 40 into contact with the inner vertical surface 51 of the sleeve portion. The sleeve portion 35 will then provide a lateral support for checking further radial expansion of the upper part of the vessel and reducing the amount of any further radial expansion in the lower part thereof.

Such radial expansion of the lower part of the vessel is indicated by the slightly bulged configuration shown by the dotted lines 50. In the event of such bulging, any vertical section of the wall of vessel 10 has the character of a "lever" which may be considered as pivoted at the region $o$ marking the bottom of the engaged vertical surfaces 51 and 52. This lever is subjected below the region $o$ to the lateral pressure $p$ exerted by the medium in the chamber, and the lower part of the lever will be urged outwardly to produce a bending moment therein. Since the lever is pivoted at region $o$, the effect of this outward bending moment is to produce an inward bending moment in that part of the lever which lies above region $o$ and which forms part of the vessel wall surrounding the mouth 12. This inward bending moment is represented by the arrows $f$ in FIG. 1. As shown by those arrows, the effect of the inward bending moment is to tend to close the mouth 12. However, because of the snug fit of the plug 20 in the mouth, the plug provides a lateral support which checks deformation of the vessel due to such inward bending moment.

We shall now explain how the embodiment of FIGURE 1 functions to avoid loss of "seal-in" pressure. Such pressure loss tends to arise from the following causes: When a medium at high temperature is present in the chamber 11, the heat from the chamber will be communicated to the sleeve portion 35 of cover 26 to produce therein a thermal expansion. The significant part of this expansion is the expansion $\Delta l_1$ occurring for the sleeve portion in the length $l_1$ which extends vertically from the shoulder 37 to the bottom of head portion 25 of cover 26. As this expansion in the sleeve portion takes place, the shoulder 37 of the sleeve portion will remain engaged with the shoulder 41 of the vessel 10. The tendency of such expansion is to displace the bottom of head portion 25 in the upward direction and by the amount $\Delta l_1$.

If no other action were present, the pressure from chamber 11 would force plug 20 upwardly to follow the upward displacement of head portion 25. The result would be an opening by the amount $\Delta l_1$ in the spacing of the surfaces 21 and 13 between which the gasket 14 is compressed. Any such increase in the spacing between those two surfaces would cause a loss of "seal-in" pressure, i.e., the pressure with which elastic gasket 14 bears against the surfaces 21 and 13.

This loss in seal-in pressure is overcome in the FIG. 1 embodiment by establishing therein a relation such that, in the presence of high temperature in chamber 11, there will be no increase in the spacing of the gasket compressing surfaces 21 and 13. The relation may be quantitatively set forth in mathematical form by the expression:

$$\Delta l_2 + \Delta l_3 \geqq \Delta l_1 + \Delta l_4 \qquad (1)$$

where $\Delta l_1$ has the same meaning as before, $\Delta l_2$ is the thermal expansion of the vertical length $l_2$ of the bolts 30 from the bottom of head portion 25 to the top of plug 20 $\Delta l_3$ is the thermal expansion of the vertical length of plug 20 from the top to the bottom thereof, and $\Delta l_4$ is the vertical expansion of vessel 10 between the shoulders 41 and 13.

In most instances, the quantity $\Delta l_2$ is negligible in amount relative to the quantities $\Delta l_1$, $\Delta l_3$ and $\Delta l_4$. Therefore, for most practical purposes, Expression 1 can be simplified to the following expression:

$$\Delta l_3 \geqq \Delta l_1 + \Delta l_4 \qquad (2)$$

The requirement is essentially that the downward expansion $\Delta l_3$ of the length $l_3$ of plug 20 is to be equal to or greater than the upward expansion $\Delta l_1$ of the length $l_1$ of the sleeve portion 35 plus the expansion $\Delta l_4$ of the vertical portion of vessel 10 extending between the place 13 of support of the underside of the gasket and the place 41 where the cap contacts the outside of the vessel. If $\Delta l_3$ equals $\Delta l_1$ plus $\Delta l_4$, then the spacing between surfaces 21 and 13 will remain the same at high temperature as it is at low temperature to thereby maintain constant seal-in pressure so long as the elasticity of the gasket remains constant. If $\Delta l_3$ is greater than $\Delta l_1$ plus $\Delta l_4$, then the spacing between surfaces 21 and 13 will get smaller as the temperature rises. The decrease in spacing between the surfaces 21, 13 with increasing temperature is a particularly desirable result in the instance where the gasket has lost elasticity with increasing temperature and the amount of such decrease with temperature rise can be adjusted to compensate fully for any such loss of elasticity. Furthermore, such rate of decrease in the spacing of surfaces 21, 13 may, if desired, be made sufficiently high so that the seal-in pressure will actually increase with increasing temperature over a range of temperature rise.

There are three separate features of construction which may act individually or collectively to attain the relation set forth by Expression 2. First, the expansion length $l_1$ of the sleeve 35 may be made less than the expansion length $l_3$ of the plug 20. With the vertical effective length of the plug exceeding the vertical effective length of the sleeve, the expansion of the plug will tend to be greater than the expansion of the sleeve when the plug, the vessel and the sleeve have the same thermal coefficients of expansion, and when, as is inherent in the configuration of the FIG. 1 embodiment, the plug is heated to a higher temperature than the sleeve subjected to about the same temperature.

Second, the plug 20 may be formed of a material having a higher thermal coefficient of expansion than the material of which the cover 26 is formed. For example, the plug 20 may be formed of stainless steel while the cover 26 may be formed of high carbon steel which, as is well known, has a substantially lower coefficient of expansion. In the instances where the values of $\Delta l_3$ and $\Delta l_4$ rather than the value of $\Delta l_4$ control in the above Expression 2 whether or not the left-hand side of the expression is equal to or greater than the right-hand side thereof, such difference in the thermal coefficients of expansion of the materials of, respectively, the plug 20 and the cover 26 will act to maintain or increase the seal-in pressure.

Third, the thermal conditions for plug 20 and sleeve 35 may be controlled other than inherently so that, in response to a given temperature in chamber 11, the plug will be heated to a higher temperature than the sleeve. As previously pointed out, such differential heating of elements 20 and 35 is, to an extent, inherent in the configuration of the FIG. 1 embodiment, since the plug 20 is in closer proximity to chamber 11 than is the sleeve portion 35. However, the heating of element 20 to a higher temperature than element 35 is implemented by the presence of the insulating body 28 which is disposed over the top of plug 20 and inhibits heat loss in the upward direction from plug 20.

Figure 3:
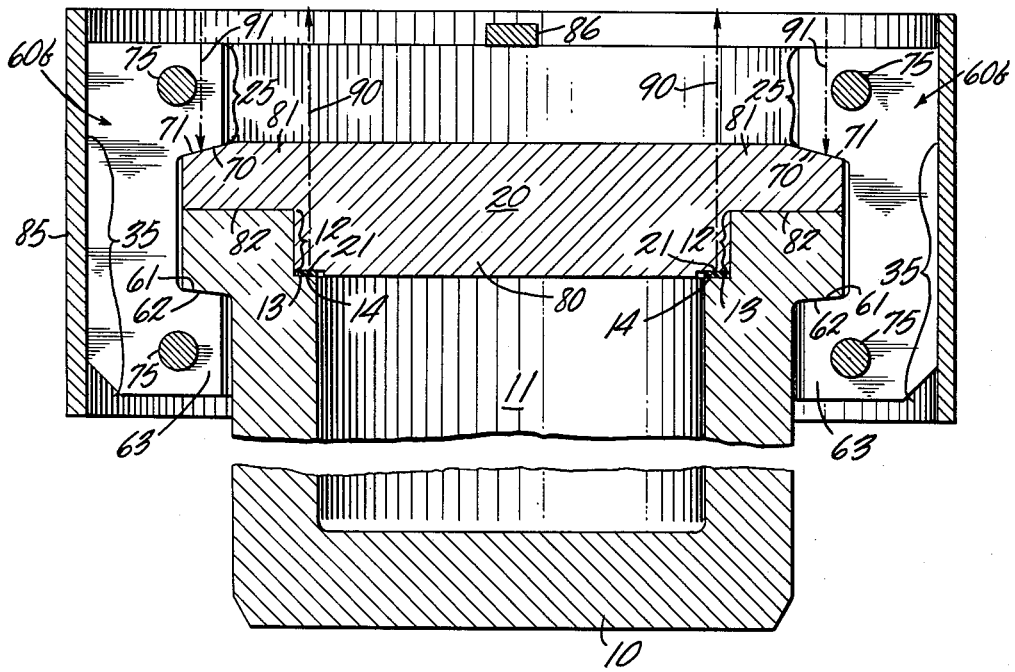
FIG. 3 is a front elevation in cross-section of another embodiment of the invention.
Figure 4:
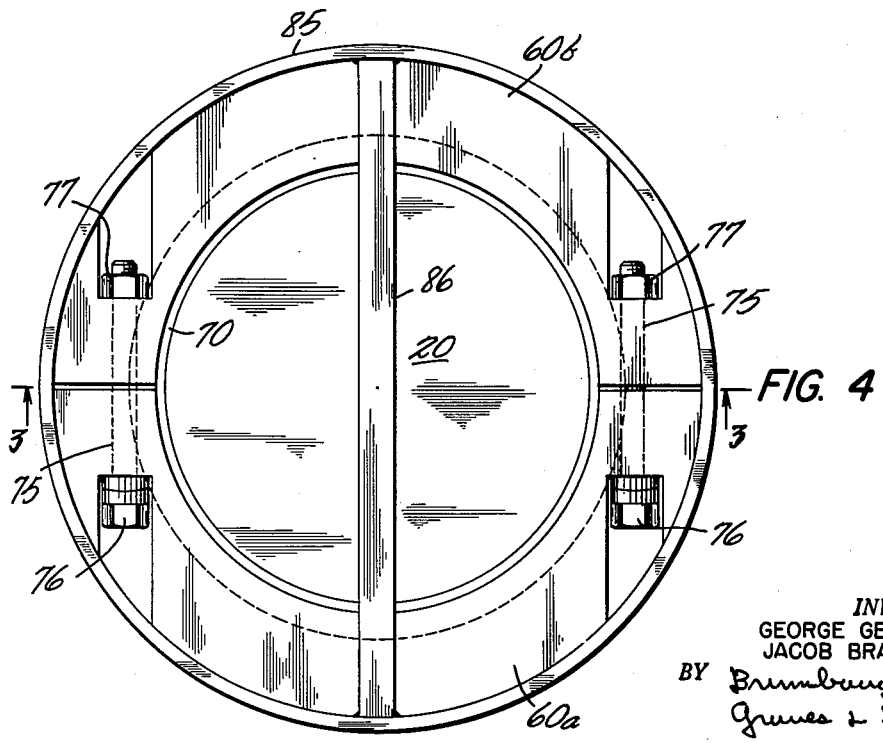
FIG. 4 is a plan view of the FIG. 3 embodiment.

FIGS. 3 and 4 illustrate another embodiment of the invention which is characterized by the same advantages as FIG. 1, and by other advantages as well. The differences of the embodiment of FIGS. 3 and 4 from that of FIG. 1 are as follows:

In the FIGS. 3 and 4 embodiment (and as best shown in FIG. 4), the cap means for the plug 20 is split cap means comprised of a pair of semi-circular cover members which are individually designated as 60a, 60b, but which will be collectively referred to as the cover members 60. Each cover member 60 acts as does the unitary cover 26 of FIG. 1 to retain plug 20 in mouth 12 of the vessel as a consequence of an engagement made between each cover member and the side of the vessel. This engagement, however, is not between lugs as in FIG. 1, but instead, is between a downturned annular shoulder outstanding from vessel 10 and an upturned shoulder 62 which is provided by a rim portion 63 instanding from the sleeve portion 35 of each cover member 60.

The shoulder 62 of each cover member is of arcuate form in the horizontal plane to match the curvature in that plane of the annular shoulder 61 on the vessel. As shown in FIG. 3, the surface of the annular shoulder 61 on the vessel is radially inclined to the horizontal to face downwardly and outwardly from the vessel 10. On each cover member, shoulder 62 which engages shoulder 61 has a surface whose radial inclination to the horizontal matches that of shoulder 61, whereby the shoulder 62 faces outwardly and upwardly towards shoulder 61 from the rim portion 63 of the cover member. Preferably, the inclination to the horizontal of shoulder 61 and of the shoulder 62 of each cover member is an inclination which is less than the natural angle of slippage at an engagement interface of the materials of which the vessel 10 and the cover members 60 are constituted. If the vessel cover members are both formed of stainless steel, the natural angle of slippage will be about 7°.

FIGS. 3 and 4 represent that relative position of the cover members 60 in which they have been brought together to lie in lateral side by side relation over the plug 20. While in such position, the shoulders 62 of the cover members engage with the annular shoulder 61 of the vessel. Moreover, while the cover members are in such relative position, the head portions 25 thereof engage the top of the plug 20. This latter engagement takes place between (a) an inclined annular chamfer 70 formed in the top of plug 20 and having a radial inclination to the horizontal plane, and (b) a contact surface 71 formed in the interior of each cover member to have a radial inclination to the horizontal plane and an arcuate curvature in the horizontal plane which renders the surface 71 matching the portion engaged thereby of the chamfer 70 on the plug. The radial inclination to the horizontal of the chamfer 70 and of each contact surface 71 is an inclination which is less than the natural angle of slippage at an engagement interface of the materials of which the plug 20 and the cover members 60 are respectively constituted. If the cover members are of stainless steel, and if the plug 20 is formed of high carbon steel, this natural angle of slippage will again be about 7°.

The vessel assembly may be opened and the plug 20 vertically removed from mouth 12 by laterally moving the cover members 60 apart in an amount sufficient to create therebetween a space through which plug 20 will pass freely in the vertical direction. When the cover members are in this separated position, and when the plug has, say, been removed from the mouth 12 and then been replaced therein to be reseated on gasket 14, the expanded vertical dimension of the uncompressed gasket will raise the plug slightly above its operating position. This raising of the plug will render the distance of separation between the inclined chamfer 70 of the plug and the inclined shoulder 61 of the vessel of a value which is greater than that of the distance of separation between the interior contact surface 71 of each cover member and the shoulder 62 thereof. Under these cricumstances, as the cover members 60 are laterally moved back together into side by side relation, the shoulder 62 of each cover member will wedgingly engage the shoulder 61 of the vessel, and, simultaneously, the contact surface 71 of each cover member will wedgingly engage the chamfer 70 of the plug. The former wedging engagement draws the cover members 60 down on the vessel to thereby indirectly force the plug 20 down on gasket 14. The latter wedging engagement directly forces the plug down on the gasket. Therefore, while either wedging engagement could be employed to produce a pressure engagement of the plug with the gasket, in the FIG. 3 embodiment the two described wedging engagements act cumulatively to produce such pressure engagement.

Since the inclination to the horizontal of the engagement interface between shoulder 61 and each shoulder 62 is less than the natural slippage angle for such interface, and, also since the inclination to the horizontal between chamfer 70 and each contact surface 71 is an inclination which likewise is less than the natural slippage angle for the last-named interface, the cover members 60 will each be frictionally self-locked with the vessel 10 and with the plug 20 upon coming into engagement with those last-named elements. However, to assure better retention of the cover members on the vessel and plug, and to overcome the frictional force opposing lateral movement together of the cover members as the pressure becomes greater at the interfaces of the wedging engagements, the final drawing together and securement of the cover members 60 may be accomplished by the turning of four tightening bolts 75 having heads 76 which are countersunk in the cover member 60a. Each bolt 75 passes laterally through an unthreaded hole in the oppositely disposed cover member 60b to have the threaded free end of the bolt received in a nut 77 which is countersunk in the cover member 60b.

As stated, the plug 20 is forced down against gasket 14 by the cumulative action of a wedging engagement made at less than natural slippage angle between each cover member 60 and the plug, and of a wedging engagement which is likewise made at less than natural slippage angle between each cover member and the vessel. The feature of employing two such wedging engagements rather than only one to force down the plug has the advantage that, while the cover members will be self-locking in place because neither engagement exceeds the natural slippage angle, the lateral displacement $s$ required for each cover member by wedging action to vertically displace by $d$ the plug 20 is a lateral displacement which is only about half that which would be required to displace the plug by the same amount $d$ through the action of only one wedging engagement at less than natural slippage angle. As a specific example, if only one wedging engagement is used, and the interface over which engagement takes place is an interface having an inclination approximating the natural slippage angle $\alpha$ therefor, the relation between the lateral displacement $s$ of each cover member and the downward displacement $d$ of the plug is given by the expression:

$$s = d \cot \alpha \qquad (3)$$

Now, if to this wedging engagement there is added the effect of a second similar wedging engagement, the relation between the quantities $s$ and $d$ becomes:

$$s = 2d \cot \alpha \qquad (4)$$

For small angles, however, the above Expression 4 is approximated by the following expression:

$$s = d \cot 2\alpha \qquad (5)$$

From Expression 5, it will be seen that, by using two wedging engagements, the lateral displacement $s$ required of each cover member to move plug 20 by the amount $d$ is a displacement which, to a first approximation, depends upon the cotangent of the virtual slippage angle $2\alpha$ rather than of the cotangent of the natural slippage angle $\alpha$. Since cotangent $2\alpha$ is about half cotangent $\alpha$, there is a reduction by about one-half in the lateral displacement $s$ required to produce a given vertical displacement $d$ of the plug. At the same time, the self-locking characteristic of the natural slippage angle $\alpha$ is retained, since in neither of the two wedging engagements is this natural slippage angle exceeded.

It will be noted that, in the FIG. 3 embodiment, the plug 20 has a lower stem portion 80 and an upper flange portion 81. The stem portion 80 is received within the mouth 12 of the vessel to have a snug fit therein and to press against the gasket 14. The flange portion 81 is, on the other hand, seated on a flat lip 82 which is provided by the surface of vessel 10 which surrounds the mouth 12.

As the plug 20 is displaced downwardly by the described wedging engagements of cover member 60, the gasket 14 will be compressed by stem portion 80 until the flange portion 81 comes into engagement with the lip 82. Such engagement arrests the downward movement of the plug and stops compression of the gasket. As the bolts 75 are further tightened to intensify further the wedging engagements made by the cover member 60, there will be a preloading of the plug 20 to maintain flange portion 81 firmly on lip 82 in the presence of upward pressure exerted on the plug. It will be observed that the compression of gasket 14 may be set for an optimum value and that at the same time plug 20 may be preloaded to compensate for pressure exerted upward on plug 20 from chamber 11.

The FIG. 3 embodiment may also be adapted to avoid loss of seal-in pressure by including the features of construction which have been specifically described for FIGURE 1. It will be apparent that the FIGURE 3 embodiment has particular structural and operating advantages in that only a few tightening bolts are required and the forces to be applied through the tightening bolts are relatively low as compared with the seal-in pressures that are produced. Furthermore, operation is facilitated by the fact that the cover members 60 are moved horizontally and the only weight which must be lifted or lowered during operation is that of the plug 20.

As shown in FIGURE 3, the cylinder formed by the assembled cover members 60 is encircled by a reinforcing means in the form of an unsplit sleeve or ring 85 having a horizontal brace 86 at the top thereof. The ring 85 may have either a slip fit or a shrink fit about the cover members. A shrink fit can be obtained by preheating ring 85, slipping it over the split ring formed by the assembled cover members, and then equalizing the temperature of the two rings. Alternatively, a shrink fit can be obtained by constructing the cover members to provide a slight taper in the cylinder formed thereby when assembled together, by shaping the interior surface of the ring 85 to have a matching taper, and by axially moving the ring 85 over and then along the cover members 60 to produce a forcible engagement between the tapered surface of the ring and the tapered surface presented by the assembled cover members.

The ring 85 acts as a safety device as follows. In the event that the holding bolts 75 should happen to fail, the only force tending to maintain the cover members 60 in engagement with the plug 20 and the vessel 10 would be the force of friction. If the cover members 60 were then laterally dislodged, the plug 20 would be violently blown out of the vessel 10 when the cover members 60 were separated to a degree where either the contact surfaces 71 of the cover members no longer were bearing on the chamfer 70 of the plug or where the shoulders 62 of the cover members no longer were bearing against the shoulder 61 of the vessel. The ring 85, however, would prevent the cover members 60 from becoming laterally separated to that dangerous degree. Consequently, even if the bolts 75 were to fail, the plug 20 could not be ejected from the vessel and a dangerous failure of the entire vessel assembly would be precluded.

A problem encountered in the construction of pressure vessel assemblies is that of upward dishing of the plug. One of the causes of such upward dishing is represented in FIG. 3. As indicated by the dot-dash lines 90 therein, the gasket 14 exerts an upward force on the plug 20 over the annular area of the gasket. At the same time, as indicated by the dot-dash lines 91, such upward force is opposed by a downward force exerted on the plug 20 by the cover members 60 over the annular area of contact between the cover members and the plug. The respective areas of action of the upward force and of the downward force are not, however, in vertical alignment. Instead, the area of action of the downward force is radially outward of the area of action of the upward force. Hence, the section of plug 20 which horizontally lies between lines 90 and 91 will be subjected to a bending moment which tends to rotate the section up on the inside and down on the outside. This bending moment will cause the plug 20 to be dished upwardly to thereby develop undesirable stress and deformation in the plug.

Another factor tending to produce such dishing is the pressure exerted on the bottom of the plug from chamber 11. Upward dishing may occur because the upward pressure on the plug is exerted over the central area thereof, whereas the restraining force which acts downwardly on the plug is a force which is exerted over a peripheral area thereof.

The upward dishing of the plug is undesirable because it produces unwanted stress and deformation in the plug and because it tends to warp upwardly the inner edge of the surface 21 by which the plug is seated on gasket 14. Such warping of the surface 21 tends to weaken the firmness of the seal between surface 21 and gasket 14.

Figure 5:
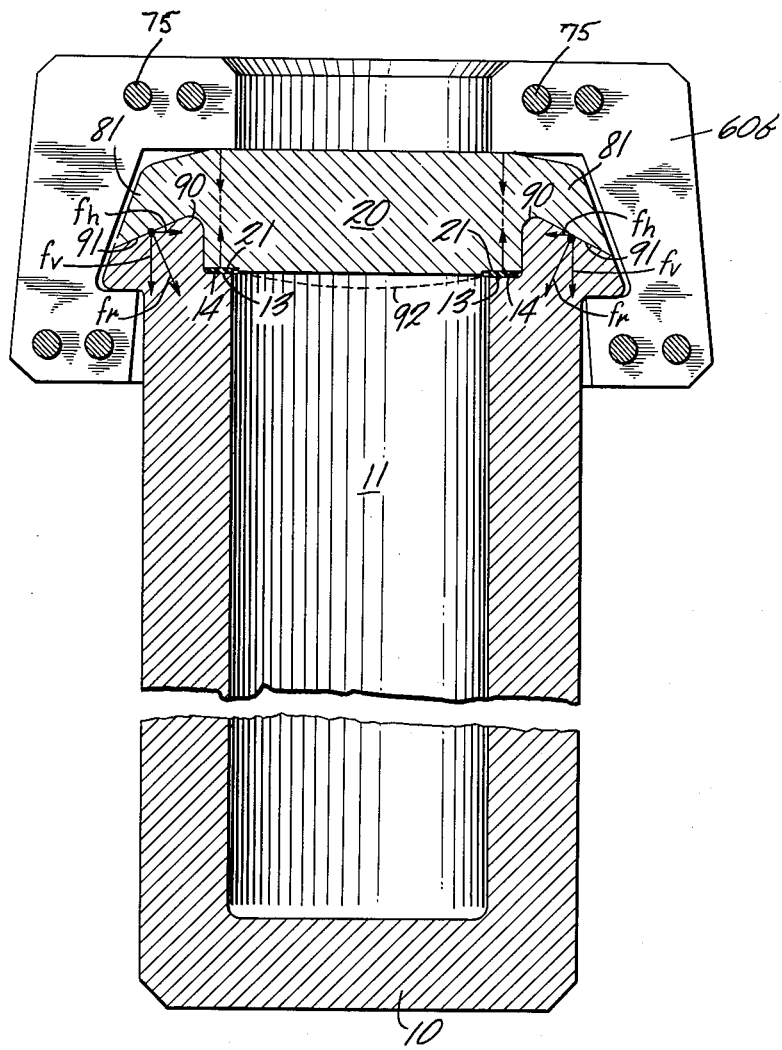
FIG. 5 is a front elevation in cross-section of a modification of the FIG. 3 embodiment.

FIG. 5 represents the FIG. 3 embodiment as modified to incorporate features which are adapted to minimize or counteract the upward dishing which has just been discussed. As shown in FIGURE 5, the top of plug 20 and the interiors of the cover members 60 are shaped so that the area of contact between each cover member and the plug is an area which is disposed at least as far inwardly as the below-lying area where contact is made between the plug and the gasket 14. When, as shown in FIG. 5, the upper area of contact is in direct vertical alignment with the lower area of contact, no bending moment whatever will be produced by the upward force exerted on the plug from the gasket and the downward force exerted on the plug from the cover members 60. If desired, the upper area of contact may be extended somewhat inwardly of the lower area of contact to produce a binding moment which will compensate in whole or in part the binding moment tending to cause upward dishing in the plug.

Upward dishing of the plug may also be opposed, as shown in the FIGURE 5 embodiment, by imparting to the lip 82 for mouth 12 a surface contour such that, as the lip progresses radially upward from the mouth, the lip is faired close by the mouth to rise to a peak 90, and the lip then slopes linearly downward from this peak to the outer margin of the vessel. The linear downward slope of the lip surface forms on the lip an annular chamfer 91 which occupies the major portion of the radial extent of the lip, and which is so disposed that the surface of the chamfer faces upwardly and outwardly from the vessel.

As indicated by FIGURE 5, the annular underside of the flanged portion 81 of plug 20 is shaped to match the described surface contour of the lip 82, and when flange portion 81 is seated on lip 82, a continuous interface exists between those elements.

As the cover members 60 wedge the plug 20 downwardly, the plug 20 will exert a downward force on the section of the interface which is bounded by the chamfer 91. As represented by the arrows $f_r$, this downward force will act normally of the section of interface to which it is applied and will act somewhat inwardly as well as vertically. The force $f_r$ can be resolved into a vertical component, represented by the arrow $f_v$, and an inwardly directed horizontal component represented by the arrows $f_h$.

The horizontal component $f_h$ will press inwardly on plug 20 around its entire periphery to thereby circumferentially compress the plug. This circumferential compression is manifested in the plug by the establishment in the bottom thereof of a slight downward bulge indicated in FIGURE 5 by the dotted line 92. This downward bulge has a curvature opposite to that of the upward dishing produced in the bottom of the plug by pressure exerted from below and neutralizes the effect of the upward dishing.

FIGURES 6 and 7 represent the FIG. 3 embodiment adapted to work with means for facilitating lateral movement of the cover members 60. For convenience of illustration, one cover member is shown in retracted position, while the other cover member is shown in operating position. The ring 85 of the FIGURE 3 embodiment is not shown.

In FIGURES 6 and 7, each cover member 60 is supported by a cradle 95 which is open at the end thereof towards the vessel 10. Within the cradle 95, the cover member rests upon a bed 96. This bed 96 is characterized at the end thereof toward the vessel by a semi-circular recess 96a. The recess 96a is of a radius which is adapted to accommodate with clearance the curved outside wall of vessel 10 when the cradle 95 is moved towards the vessel to bring the cover member 60 into wedging engagement with the vessel and the plug 20. To the rear of the end of bed 96 in which recess 96a is formed, there is upstanding from the margin of the bed 96 a side wall 97. This side wall extends around the cradle 95 to encompass all but the front end of the cover member 60. A pair of fasteners 98 secure the cover member 60 to the top of the side wall. If desired, the bottom of the cover member may be attached to the bed 96 of the cradle by tack welding or the like.

Each cradle 95 carries beneath its bed 96 a plurality of ball transfers 99 which roll upon a horizontal platform 100. Those ball transfers render each cradle 95 freely movable over the platform. Hence, the combination of the cradles, ball transfers and platform is a combination which minimizes the effort needed, during changeover of the vessel assembly, to laterally separate the covers and, later, to replace them in side by side relation.

While such effort may be minimized, it is still substantial when the cover members are of a massive construction to assure containment of the high pressure within vessel 10. In such instance, the changeover time for the vessel assembly can be considerably reduced by utilizing external power. As shown in FIGURES 6 and 7, power may suitably be applied by a pair of ram units 105 mounted on the platform 100. Each ram unit is coupled through a connecting rod 106 to the rearward facing portion of the side wall 97 of a respective one of the cradles 95. By virtue of this coupling, each ram unit upon actuation thereof is adapted to linearly and horizontally displace a respective one of the cover members 60. The ram units 105 may be actuated either pneumatically or hydraulically.

When the cover members have been tightly drawn by the action of the ram units 105, the cover members may be secured by fastening lug means 107 of which a pair are outstanding from each cover member 60 (FIG. 6), and of which the lug means on one cover member are two section lugs (FIG. 7) and the lug means on the other other cover member are single section lugs. The laterally opposite lugs on the two cover members are disposed at different vertical heights to lap each other when the two cover members are tightly drawn on the vessel and plug. Furthermore, each lug 107 on a cover member has formed therein an aperture 108 adapted to register vertically with the similar aperture of the lapping lug or lugs outstanding from the other cover member. When vertical registration of such apertures has been attained as a result of forward actuation of the ram units 105 to drive the cover members 60 with the desired tightness into wedging engagements with the vessel and plug, the cover members are fastened together by passing a locking pin 109 (shown in phantom in FIG. 7) through the vertically registering apertures of each of the two overlapping pairs of lug means 107. As an alternative, if desired, the ram units 105 may be kept in their forwardly actuated condition during the operating cycle of the vessel assembly.

The above described embodiments and modifications being exemplary only, it will be understood that the invention described herein may comprehend embodiments differing in form and/or detail from those described above. For example, it will be understood that the ring 85 is not limited in use to the FIGURE 3 embodiment, but may also be used with the FIGURE 5 modification of that embodiment. This same ring may be employed with the FIGURE 6 modification by rendering the cradles 95 and ram units disconnectable from the cover members 60, and by dividing the platform 100 into separate halves which are laterally separable from the vessel 10. After the cradles and ram units have been so disconnected, and the platform has so been laterally separated from the vessel, and while the cover members are still held together by the lugs 107 and pins 109, the ring 85 may be placed around the assembled cover members 60.

While, in FIGURE 5, the plug 20 is not shown as having the chamfer 70 which is present in FIGURE 3, and, also, the cover members 60 are not represented as having the slanted interior surfaces 71 which are present in FIGURE 3, such chamfer 70 and surfaces 71 may be incorporated in the FIGURE 5 modification.

Instead of the pins 109 and the lugs 107, the bolts 75 (FIG. 3 or FIG. 5) may be employed in the FIGURE 6 modification to hold the cover members 60 together.

Accordingly, the invention is not to be considered as limited save as is consonant with the scope of the following claims.

We claim:

1. In a pressure vessel with a mouth therefor, the combination of a gasket disposed down in said mouth on a circumferential sealing surface formed therein, an unthreaded plug seated in said mouth on said gasket, and a cap having a sleeve portion surrounding the mouth end of said vessel and constituted of material with a lesser coefficient of thermal expansion than the material of said plug, said cap also having a head portion disposed over said plug and said cap retaining said plug in said mouth by gripping by the lower end of said sleeve portion the side of said vessel, the product of the axial extent of said sleeve portion and the thermal coefficient of expansion thereof being less than the product of the axial extent of said plug and the thermal coefficient of expansion of the latter to thereby increase the pressure exerted on said gasket by said sealing surface and plug as the temperature in said vessel rises.

2. In a pressure vessel for containing materials at high temperature, the combination of a gasket disposed down in said mouth on a circumferential sealing surface formed therein, an unthreaded plug seated in said mouth on said gasket for closing said vessel, and a cap having a sleeve portion of lesser axial extent than said plug and constituted of a material with a lesser thermal coefficient of expansion than the material of said plug, said cap also having a head portion disposed over said plug and said cap retaining said plug in position by gripping above said gasket and by the lower end of said sleeve portion the side of said vessel, the product of the axial length of said sleeve portion and the thermal coefficient of expansion thereof being less than the product of the axial length of said plug and the thermal coefficient of expansion of the latter to render the axial expansion of said plug in response to a rise in temperature greater than the axial expansion of said cap to thereby increase the pressure exerted on said gasket by said sealing surface and plug as the temperature in said vessel rises.

3. Apparatus comprising, a vessel having external down-turned shoulder means and having formed therein a pressure-containing chamber accessible from said vessel top through a mouth formed in said vessel to provide an upturned circumferential sealing surface, a gasket on said surface, a plug unthreadedly received in said mouth and having the bottom thereof seated on said gasket, cap means over said plug and extending outside said vessel downwardly and then inwardly to provide instanding upturned shoulder means under said down-turned shoulder means, and means adapted by taking up slack between said vessel, cap means and plug to render said two shoulder means engaged and to urge said plug against said gasket to thereby form a pressure seal, said plug and cap means being responsive to a high temperature condition in said chamber to manifest expansions in the vertical extent of each, and said plug and cap means being constituted of materials having relatively greater and lesser thermal coefficients of expansion and being otherwise constructed to render the axial expansion of the former at least equal to the axial expansion of the latter to thereby preclude relaxation of said pressure seal.

4. Apparatus as in claim 3 wherein the different coefficients of thermal expansion and the construction otherwise of said plug and cap means are adapted to render the expansion of the former in excess of the expansion of the latter to thereby produce a decrease in the spacing between the bottom of said plug and said sealing surface in response to said high temperature condition.

5. Apparatus as in claim 3 further comprising insulating means disposed in relation to said plug to inhibit heat loss therefrom to thereby increase the temperature assumed by said plug in response to heat received thereby from said chamber.

6. Apparatus comprising, a vessel having external down-turned shoulder means and having formed therein a pressure-containing chamber accessible from said vessel top through a mouth formed in said vessel to provide an upturned circumferential sealing surface, a gasket seated on said surface, a plug unthreadedly received in said mouth and having the bottom thereof seated on said gasket, cap means over said plug and extending outside said vessel downwardly and then inwardly to provide instanding upturned shoulder means under said down-turned shoulder means, and means adapted by taking up slack between said vessel, cap means and plug to render said two shoulder means engaged and to urge said plug against said gasket to thereby form a pressure seal, said plug and cap means being responsive to a high temperature condition in said chamber to manifest expansions in the vertical extent of each, and said plug means and cap means having relatively longer and shorter respective vertical extents and having relatively greater and lesser thermal coefficients of expansion to render the axial expansion of the former greater than the axial expansion of the latter to thereby preclude relaxation of said pressure seal.

7. Apparatus comprising, a vessel having external down-turned shoulder means and having formed therein a pressure-containing chamber accessible from said vessel top through a mouth formed in said vessel to provide an upturned circumferential sealing surface, a gasket on said surface, a plug unthreadedly received in said mouth and having the bottom thereof seated on said gasket, cap means over said plug and extending outside said vessel downwardly and then inwardly to provide instanding upturned shoulder means under said down-turned shoulder means, and means adapted by taking up slack between said vessel, cap means and plug to render said two shoulder means engaged and to urge said plug against said gasket to thereby form a pressure seal, said plug and cap means being responsive to a high temperature condition in said chamber to manifest expansions in the vertical extent of each, and said plug and cap means being formed of respective materials having relatively higher and lower coefficients of thermal expansion, and being additionally constructed to render the downward expansion of the former at least as great as the upward expansion of the latter to thereby preclude relaxation of said pressure seal.

8. Apparatus comprising, a vessel having external down-turned shoulder means and having formed therein a pressure-containing chamber accessible from said vessel top through a mouth formed in said vessel to provide an upturned circumferential sealing surface, a gasket on said surface, a plug unthreadedly received in said mouth and having the bottom thereof seated on said gasket, cap means over said plug means and extending outside said vessel downwardly and then inwardly to provide instanding upturned shoulder means under said down-turned shoulder means, and means adapted by taking up slack between said vessel, cap means and plug to render said two shoulder means engaged and to urge said plug against said gasket to thereby form a pressure seal, said plug and cap means being responsive to a high temperature condition in said chamber to manifest expansions in the vertical extent of each, and said plug and cap means having relatively longer and shorter respective vertical extents and being formed of respective materials having relatively higher and lower thermal coefficients of expansion, said plug means and cover means accordingly being constructed to render the downward expansion of the former at least the same as the upward expansion of the latter to thereby preclude relaxation of said pressure seal.

9. Apparatus comprising a vessel having a plurality of outstanding lugs spaced apart around said vessel below the top thereof, and having formed therein a pressure-containing chamber accessible from said vessel top through a mouth formed in said vessel to provide an upturned circumferential sealing surface, a gasket on said surface, a plug unthreadedly received in said mouth and having the bottom thereof seated on said gasket, a unitary cover capping said plug and extending downwardly outside said vessel to terminate in a plurality of instanding lugs each disposed under one of said outstanding lugs of said vessel, and a plurality of tightening bolts passing in threaded relation through holes formed in said cover to have the forward ends thereof bear against said plug and to urge said plug against said gasket to thereby form a pressure seal, said plug and cover being responsive to a high temperature condition in said chamber to manifest expansions in the vertical extent of each, and said plug and cover being constructed of materials having relatively greater and lesser thermal coefficients of expansion and being otherwise constructed to render the axial expansion of the former at least equal to the axial expansion of the latter to thereby preclude relaxation of said pressure seal.

References Cited in the file of this patent

UNITED STATES PATENTS

| | | |
|---|---|---|
| 1,681,150 | Vischer | Aug. 14, 1928 |
| 1,795,780 | Kiernan | Mar. 10, 1931 |
| 1,874,833 | Taylor | Aug. 30, 1932 |
| 2,166,999 | Needham et al. | July 25, 1939 |
| 2,338,622 | Cleveland et al. | Jan. 4, 1944 |
| 2,444,779 | Krasberg | July 6, 1948 |
| 2,805,445 | Billen | Sept. 10, 1957 |
| 2,886,067 | Maxwell et al. | May 12, 1959 |

FOREIGN PATENTS

| | | |
|---|---|---|
| 1,028,278 | France | Feb. 25, 1953 |